United States Patent [19]

Mizutani et al.

[11] Patent Number: 4,788,907
[45] Date of Patent: Dec. 6, 1988

[54] APPARATUS FOR LOOSENING AND FREEZING HEAT PROCESSED CEREALS

[75] Inventors: Junichi Mizutani, Sayama; Hiroyuki Arita, Hachioji, both of Japan

[73] Assignee: Nichirei Corporation, Tokyo, Japan

[21] Appl. No.: 81,290

[22] Filed: Aug. 3, 1987

[30] Foreign Application Priority Data

Aug. 11, 1986 [JP] Japan .................................. 61-188304

[51] Int. Cl.$^4$ ........................... A23B 4/06; A23B 7/04; A23B 9/00
[52] U.S. Cl. ........................................ 99/517; 62/381; 99/470; 366/102
[58] Field of Search ................. 99/348, 276, 516, 517, 99/443 C, 483, 470, 485, 323.4, 467, 479, 355; 366/234, 233, 220, 105; 62/63, 374, 378, 379, 381

[56] References Cited

U.S. PATENT DOCUMENTS

| | | | |
|---|---|---|---|
| 3,368,366 | 2/1968 | Keeling | 62/381 |
| 3,395,549 | 8/1968 | Grimes | 62/381 |
| 3,446,030 | 5/1969 | Rubin | 62/379 |
| 3,456,576 | 7/1969 | Heiland et al. | 99/323.4 |
| 3,861,654 | 1/1975 | Singleton | 366/234 |
| 3,906,743 | 9/1975 | Schorsch et al. | 62/374 |
| 3,931,757 | 1/1976 | Goode | 99/323.11 |

Primary Examiner—Timothy F. Simone
Attorney, Agent, or Firm—Charles E. Baxley

[57] ABSTRACT

An apparatus for loosening and freezing heat processed cereals is disclosed. The cereals are in the form of separate grains when in a raw state and exhibit agglutinating properties after heat processing so as to become affixed to one another. The apparatus mainly includes a cylindrical rotary drum adapted for receiving the cereals previously heat processed and for loosening the cereals so as not to form lumps or blocks while the cereals are frozen, a unit for rotating the drum, a loosening member provided in the inside of the drum for carrying up the cereals and falling down in the drum, and a fluid blowing unit. The drum includes a netted wall having a mesh size to prevent the cereals from passing through the drum. The blowing unit is adapted to blow chilling fluid into the inside of the drum through the netted wall for blowing up and simultaneously freezing the cereals.

12 Claims, 2 Drawing Sheets

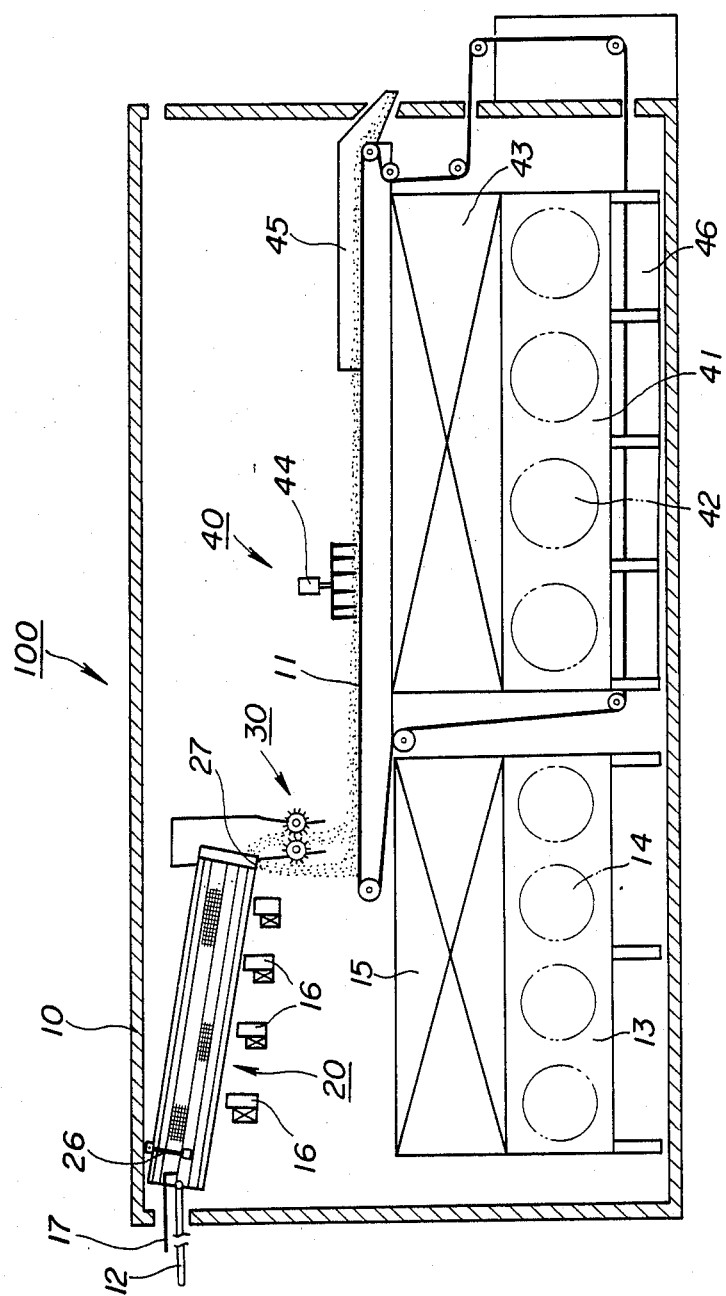

U.S. Patent  Dec. 6, 1988  Sheet 2 of 2  4,788,907
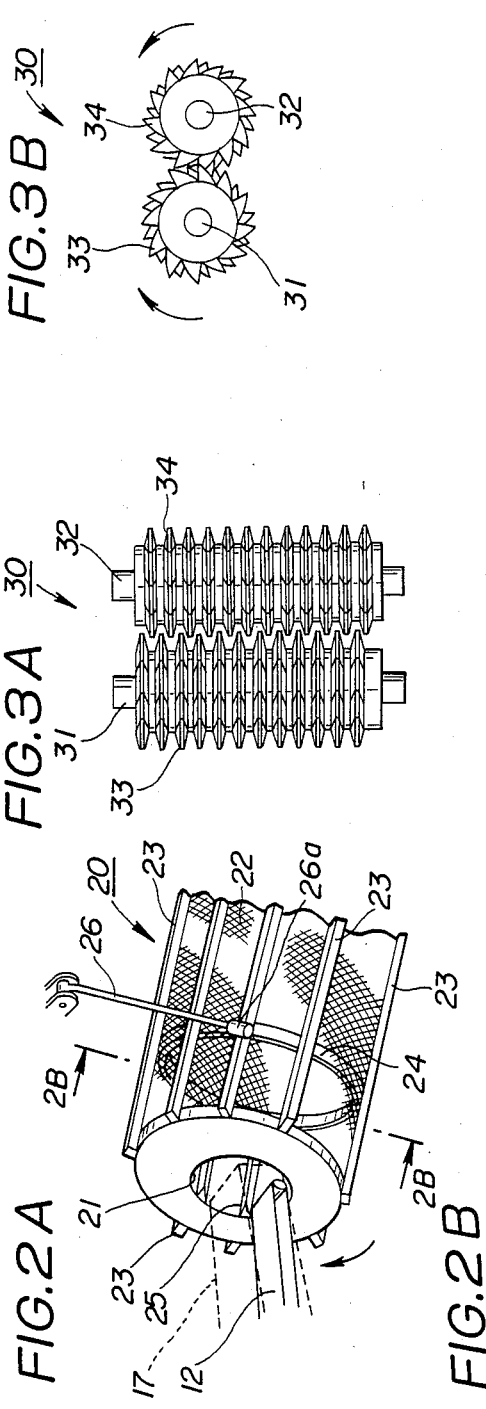
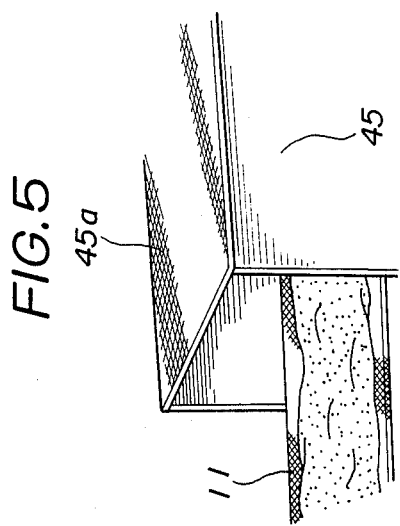
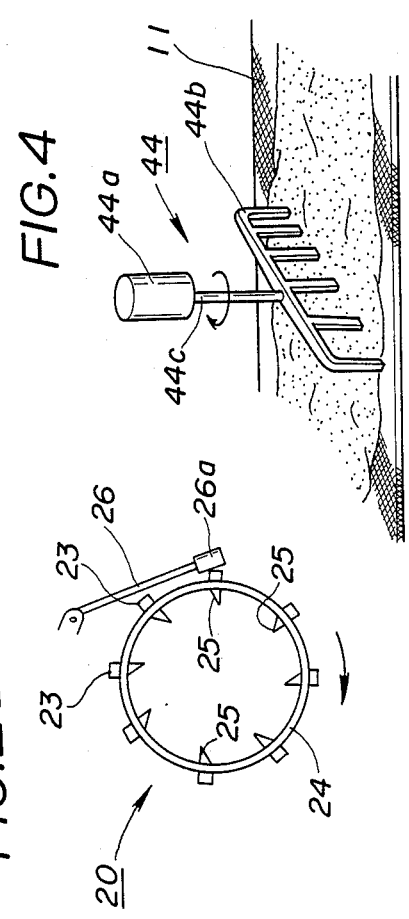

APPARATUS FOR LOOSENING AND FREEZING HEAT PROCESSED CEREALS

BACKGROUND OF THE INVENTION

1. Field of the Invention

This invention relates to an apparatus for loosening and freezing previously heat processed cereals in the form of separate grains in a raw state and exhibiting agglutinating properties after heat processing.

2. Related Art Statement

Certain known devices for freezing and preserving boiled rice make use of a liquefied gas, such as liquefied nitrogen, as a source of heating and chilling the rice. With these devices, in view of generally elevated costs required for freezing the boiled rice, a so-called air blast system has made its debut, in which chilled air is blown on to the boiled rice.

However, when the boiled rice grains are frozen by the air blast system, the rice tends to form lumps or blocks which need be separated into individual rice grains by some loosening device. If the loosening device is of poor quality and does not operate properly, the rate of the crushed or broken rice grains in the ultimate boiled and frozen rice product is increased, so that the quality of the ultimate product is lowered.

OBJECT AND SUMMARY OF THE INVENTION

It is a principal object of the present invention to provide an apparatus for loosening and freezing the previously heat processed cereals without forming lumps or blocks, the cereals being in the form of separate grains when in a raw state and exhibiting agglutinating properties after heat processing.

It is another object of the present invention to provide an apparatus for loosening and freezing heat processed cereals without forming crushed cereals.

It is a further object of the present invention to provide an apparatus for continuously loosening and freezing previously heat treated cereals inexpensively.

These and other objects of the present invention will become apparent from the following description when taken in conjunction with the accompanying drawings.

In accordance with the present invention, there is provided an apparatus for loosening and freezing heat processed cereals that are in the form of separate grains in a raw state and exibit agglutinating properties when heat processed, the apparatus comprising a cylindrical rotary drum adapted for receiving the cereals previously heat processed and thus exhibiting agglutinating properties, and for loosening the cereals so as not to form lumps or blocks, while the cereals are frozen, the drum including a netted wall having a mesh size to prevent the cereals from passing through the drum, means for rotating the drum, loosening means provided in the inside of the drum for loosening the cereals in the drum, and fluid blowing means adapted for blowing chilling fluid into the inside of the drum through the netted wall to blow up and simultaneously freeze the cereals.

BRIEF DESCRIPTION OF THE DRAWINGS

FIG. 1 is a diagrammatic view showing an embodiment of the loosening and freezing apparatus according to the present invention;

FIG. 2A is a partial perspective view showing the inlet of the rotary drum with a portion thereof being cut away;

FIG. 2B is a sectional view taken along line 2B—2B in FIG. 2A;

FIG. 3A is a top plan view showing an example of a loosening device for loosening the cereals;

FIG. 3B is a side elevational view of FIG. 3A;

FIG. 4 is a perspective view showing a dispersing device for uniformly dispersing the cereals on a belt conveyor; and FIG. 5 is a partial perspective view showing a hood adapted for preventing scattering of the boiled and frozen cereals conveyed on a belt conveyor.

PREFERRED EMBODIMENT OF THE INVENTION

Referring to FIG. 1, there is shown by a reference numeral 100 an apparatus for producing boiled and frozen rice by which boiled rice is loosened into individual grains as it is frozen so as not to form lumps or blocks. Although the present embodiment will be described with reference to the production of boiled and frozen rice, the present invention may also be applied to an apparatus for producing boiled and frozen cereals by which the cereals that are in the form of separate grains when in a raw state, such as wheat, barley or corn besides rice are heat processed and loosened into individual grains as they are frozen so as not to form lumps or blocks. Additives such as meat or vegetables may be previously added to the cereals and may be frozen with the cereals.

The apparatus for producing frozen rice 100 is comprised of a chiller 10 and various units installed in the chiller 10. More in detail, there are provided in the chiller 10 a rotary drum unit 20 for loosening boiled rice to some extent while freezing the surface of the individual rice grains, a loosening unit 30 connected to the outlet of the rotary drum unit 20 and adapted for loosening the mutually affixed boiled rice grains into separate grains, a belt conveyor 11 adapted for conveying grains of the boiled rice grains received from the loosening unit 30, and a freezing unit 40 adapted for completely freezing the boiled and partially frozen rice grains on the belt conveyor 11.

The boiled rice is spread and allowed to cool at a temperature of 40° to 60° C. After cooling, the rice is placed on an inlet belt convenyor 12 so as to be introduced at an inlet 21 of the rotary drum unit 21 (See FIG. 2A). A hood 17 is placed over the inlet belt conveyor 12 in order that the rice placed on the belt conveyor 12 is not frozen and the rice already introduced into the inside of the drum unit 20 is not returned in reverse towards the conveyor 12. The chilling air of approximately −40° C. is supplied to the rotary drum unit 20 from a plurality of fans 14 of a freezer 13 through fins 15 adapted for regulating the flowing direction of the chilling air. Simultaneously, the chilling air of approximately −40° C. is blown out at a rate of higher than 15 m/sec. from a plurality of blowers 16 arranged in the vicinity of the rotary drum unit 20.

Referring to FIGS. 2A and 2B, the rotary drum unit 20 is driven into rotation in the direction of arrows at approximately 30 r.p.m. by an electric motor, not shown. The rotary drum unit 20 is formed by a peripheral netted wall 22 of approximately 8 to 10 mesh size, in order to prevent the dropping of the introduced rice. The netted wall 22 is secured in position by axially extending parallel reinforcement rods 23 projecting radially outwards from the drum periphery. In the inside of the drum unit 20, there are provided a plurality of reinforcement rings 24 orthogonally to the reinforcement rods 23. Only one ring 24 is shown in FIGS. 2A and 2B for simplicity. On the radially inner side of each ring 24, a plurality of loosening bars 25 are mounted axially parallel to one another. These loosening bars 25 are adapted for loosening the rice grains by carrying up the rice grains with the rotation of the drum unit 20 and allowing the rice grains to descend by gravity.

A vibrating rod 26 having its proximate end pivotally secured to a certain stationary portion of the apparatus and its distal end 26 a resiliently abutting on the reinforcement rods 23 is installed at the vicinity of the inlet 21 of the drum unit 20. As the drum unit 20 is driven into rotation, the distal end 26a rides on one of the rods 23 and then impinges on the perimeter of the ring 24 so as to then ride on the next rod 23. The cycle of operation is repeated as long as the drum unit 20 is in rotational operation. With the vibrating rod 26 acting on the drum unit 20 in this manner, the rice introduced into the drum unit at the inlet 21 is not heaped thereat.

The rice introduced into the drum unit 20 is carried up by the loosening bars 25 while being blown by the chilling air supplied from the blower 16 so as to be chilled without forming lumps. In this manner, the rice grains are loosened while the surface of each rice grain is frozen effectively. Because the drum unit 20 is inclined, the rice is allowed to be shifted gradually towards the outlet of the drum unit 20 and passed through a sieve 27 shown in FIG. 1 so that the rice grains not larger in size than a prescribed value corresponding, for example to three rice grains adhered to one another, are allowed to descend onto the belt conveyor 11. On the other hand, the rice grains larger in size than the aforementioned prescribed value, such as four rice grains adhered to one another, are allowed to pass to the loosening unit 30.

As shown in FIGS. 3A and 3B, the loosening device 30 is comprised of a first rotary shaft 31 and a second rotary shaft 32 arranged parallel to each other. These shafts 31 and 32 are provided with rows of blades 33 and 34 each being formed by juxtaposed projections in the form of saw teeth as shown. The shafts 31 and 32 are driven into rotation in the opposite directions as shown by arrows in FIG. 3B so that the rice grains received between the blades 33 and 34 are loosened so as to be not larger in size than a prescribed value, for example corresponding to three rice gains adhered to one another. The loosened rice grains are conveyed by the belt conveyor 11 so as to be frozen completely by the freezing unit 40.

The belt conveyor 11 is formed by a netting of 8 to 10 mesh size to prevent the descent of the rice grains. The rice grains resting on the belt conveyor 11 are frozen by chilling air of approximately $-40°$ C. supplied from a plurality of fans 42 of a freezer 41 through fins 43 adapted for regulating the flowing direction of the chilling air. A dispersing unit 44 is provided at a position above the belt conveyor 11 for uniformly dispersing the rice being conveyed on the belt conveyor 11. As shown in FIG. 4, the dispersing unit 44 is provided with an electric motor 44a, an output shaft 44c connected to the motor 44a and a rake 44b integrally connected to and adapted for being rotated by the motor 44a. The rice uniformly dispersed on the belt conveyor 11 continues to be chilled and frozen as it is conveyed on the conveyor. The rice thus chilled and frozen are passed below a hood 45 having an upper netting 45a adapted to prevent scattering of the rice grains thus chilled and frozen and thus reduced in weight. The frozen rice grains are then passed through a packaging unit which is known per se and hence omitted from the drawing for simplicity. The belt conveyor 11 is washed with water in a washing unit 46.

Although the present invention has been described with reference to the preferred embodiment, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. An apparatus for loosening and freezing heat processed cereals into individual grains, said cereals being in the form of separate grains in a raw state and exhibiting agglutinating properties when heat processed, said cereals being selected from the group consisting of rice and rice with additives, said apparatus comprising in combination:

a cylindrical rotary drum for receiving said cereals previously heat processed and this exhibiting agglutinating properties, and for loosening said cereals so as not to form lumps or blocks, while the cereals are frozen, said drum including a netted wall having a mesh size to prevent the cereals from passing through said drum, means for rotating said drum, means provided in the inside of said drum for carrying up and subsequently dropping said cereals in said drum for loosening said cereals in said drum, and means for blowing a chilling fluid into the inside of said drum through said netted wall to blow up and simultaneously freeze said cereals.

2. An apparatus according to claim 1 further comprising means provided in the vicinity of a position of receiving the cereals for vibrating said drum to prevent said cereals from forming lumps or blocks.

3. An apparatus according to claim 2 wherein said vibrating means includes projections radially extending outwards from the periphery of said rotary drum and a rod adapted to ride on said projections and then impinge on said periphery with rotation of said drum.

4. An apparatus according to claims 1, 2 or 3 further comprising a second means for receiving the cereals from said drum and loosening lumped cereals having a size larger than a predetermined value.

5. An apparatus according to claim 4 wherein said second loosening means includes a pair of rotary shafts and blade means attached to said shafts for breaking said lumped cereals.

6. An apparatus according to claim 4 further comprising sieve means for classifying and passing cereals not larger in size than said predetermined value before supplying the cereals from said drum to said second loosening means.

7. An apparatus according to claim 6 further comprising means for receiving the cereals from said second loosening means and said sieve means and for freezing the received cereals.

8. An aparatus according to claim 7 wherein said freezing means includes a conveyor for conveying said cereals and means for supplying the chilling fluid for freezing the cereals on said conveyor.

9. An apparatus according to claim 8 further comprising means for uniformly dispersing the cereals on said conveyor.

10. An apparatus according to claim 9 wherein said dispersing means includes a rotary shaft, means for rotating said rotary shaft and a rake connected to said shaft and adapted for dispersing said cereals on said conveyor.

11. An apparatus according to claim 7, 8, 9 or 10 further comprising a hood for preventing scattering of said cereals being conveyed on said conveyor.

12. An apparatus according to claim 1 wherein said loosening means includes a plurality of loosening bars for carrying up and subsequently dropping said cereals.

* * * * *